Jan. 25, 1966 J. L. DROSSMAN ET AL 3,230,821
OPTICAL MEANS FOR MEASURING SLOW ANGULAR RATES OF ROTATION
Filed July 6, 1961 2 Sheets-Sheet 1

INVENTORS
JAY L. DROSSMAN
HOWARD P. ISRAEL
FREDERICK H. LUTZE
BY Herbert L. Davis
ATTORNEY INVENTORS
JAY L. DROSSMAN
HOWARD P. ISRAEL
FREDERICK H. LUTZE
BY Herbert L. Davis
ATTORNEY

United States Patent Office 3,230,821
Patented Jan. 25, 1966

3,230,821
OPTICAL MEANS FOR MEASURING SLOW ANGULAR RATES OF ROTATION
Jay L. Drossman, Bergenfield, N.J., Howard P. Israel, Waltham, Mass., and Frederick H. Lutze, New Rochelle, N.Y., assignors to The Bendix Corporation, Teterboro, N.J., a corporation of Delaware
Filed July 6, 1961, Ser. No. 122,210
2 Claims. (Cl. 88—14)

The present invention relates to optical means of measuring slow angular rates of rotation.

Heretofore, small constant angular rates of rotation have been measured with an optical device called an autocollimator and a reflecting member. The autocollimator is a device which emits parallel rays of light, and will receive back a reflected image if the reflection is within a predetermined arc, for example, ten minutes of arc, of the emitted light. It is capable of measuring small differences between the angle of emanated and returning reflected rays. The reflecting member that was formerly used was annular shaped, having two adjacent mirror faces set apart at a small but exactly measured angle. It was mounted with the mirrored faces in a plane parallel to the polar axis of the body that was to be rotated, and whose rate of rotation was to be measured. The autocollimator was aligned perpendicular to one of the mirrored surfaces. As the body and the attached member rotated, the reflected image from the first mirror aligned itself with an arbitrary point on the autocollimator scale. The time was noted by an observer. As the body and prism continued to rotate, the reflected image from the mirror surface moved out of the range of the autocollimator. As the body continued to rotate, the second mirrored surface became perpendicular to the autocollimator, and the reflected image came into the range of the autocollimator. When the observer saw the image aligned at the same arbitrary point on the scale, he noted the time. Whereby, knowing the time elapse ($x$ second), and the angle between the mirrored faces ($y$ degree), the speed of rotation V was computed in degree/seconds.

$$V = \frac{y \text{ degrees}}{x \text{ seconds}} = \text{angular velocity}$$

In the system heretofore used, light returning from one mirrored surface into the autocollimator entered one side of the autocollimator lens. As the prism rotated, reflected light from the other mirrored surface entered through another portion of the autocollimator lens. Thereby errors in the order of several seconds of arc could occur, due to abberations in using different parts of the lens system of the autocollimator (if such an error of the lens system exists).

Exact angular rate measuring techniques are very important in the testing of inertial guidance systems and components, in particular, measurements of angular rates on the planetary test stand and the sidereal test stand. In the case of both test stands, the major function is for the test stand to rotate (about a polar axis, which has been closely aligned in a north-south direction and at the correct latitude) at a constant rate, equal in magnitude to the earth's rotation about its own polar axis, but in the opposite sense. The purpose of these test stands is to null out the effect of the earth's rate on the performance of a gyroscope, as in the case of the sidereal stand, and to null out the effect of the earth's rate on the performance of a stable platform in the case of the planetary test stand.

The performance of the above test stands are rigidly set at an angular rate of 15.041°/hr. with the accepted tolerance of ±.005°/hr.

Therefore, assume the angle of rotation being sampled is 1°30′00″ of arc. The time to rotate the stand through this angle at the earth's rate would be:

$$\text{Mean value} = \frac{1°30'0''}{15.041°/\text{hr.}}$$

$$= \frac{5400 \text{ sec. arc}}{15.041 \frac{\text{sec. arc}}{\text{sec. time}}} = 359.018 \text{ secs. time}$$

$$\text{Fast limit} = \frac{5400}{15.046} = 358.899 \text{ secs. time}$$

$$\text{Slow limit} = \frac{5400}{15.036} = 359.138 \text{ secs. time}$$

Therefore, if the clock reads more than 359.138 seconds, or less than 358.899 seconds, the stand is not rotating about the polar axis within the required 15.041 ±.005°/hr.

It can be seen that any error of two (2) seconds of arc or greater as occurs when using the annular member will give false values. For instance, assume the angle between the two mirrored faces is actually 5400 seconds of arc, but due to some error in the optical system of the autocollimator the second image is displaced two (2) seconds of arc. Then, $$\frac{5402}{15.041} = 359.152 \text{ seconds}$$

Although the stand is rotating at the earth's rate, we would falsely believe the stand to be out of our tolerance range. However, with an improved prism, errors due to lens imperfections of the autocollimator are removed.

An object of the invention is to measure the rate of slow angular movement with a hight accuracy.

Another object of the invention is to measure small angular displacements with a high occuracy.

Another object of this invention is to have reflected light pass through the same portion of the autocollimator lens, thereby any error in the lens causing displacement of the reflected first image will cause the same displacement of the second reflected image and in the final analysis no error would be seen.

Another object of the invention is to have reflected light from a reflecting member pass through the same portion of an autocollimator lens, by employing a relatively small reflecting member.

Another object of the invention is to enable collimated rays of light to always pass through the same point in the lens system and thereby completely eliminate any error due to imperfections in the lens, by means of a prism and by making use of the index of refraction of the prism in conjunction with its geometry.

Another object of the invention is to employ a reflecting member that does not have any angles on its reflecting surface, as such angles lack sufficient sharpness causing distortion in light reflected therefrom.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
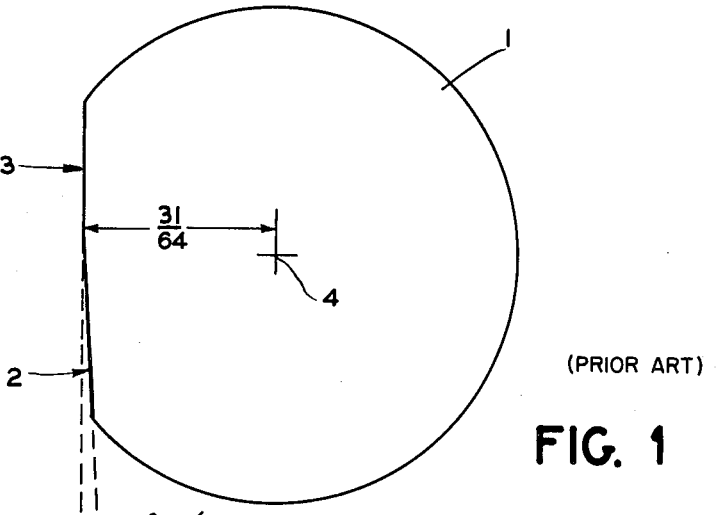
FIGURE 1 is a top view of a conventional mirror.

Referring to the drawing of FIGURE 1 there is shown therein a conventional annular mirror 1 having a radius of $^{31}\!/_{64}$ inches from the center of rotation 4 in the mirror faces 2, 3. The two surfaces 2 and 3 are aluminized and are set off at an angle of 1°30′ of arc to each other. This lens is mounted on the rotating body (not shown); and rotates about an axis 4 which is also the polar axis of the rotating body.

Figure 2:
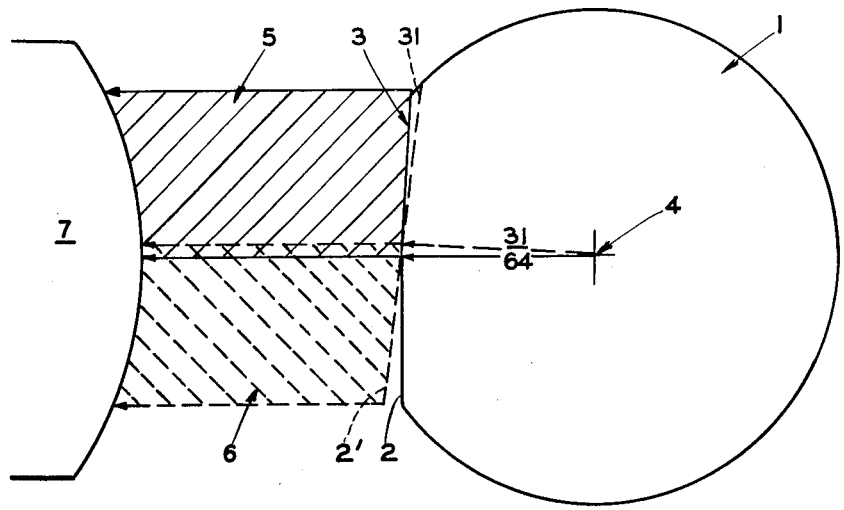
FIGURE 2 is a top view of the conventional mirror of FIGURE 1 shown schematically in operative relation with the lens of the autocollimator.

FIGURE 2 shows the annular mirror 1 and the lens 7 of the autocollimator. As the rotating body turns (in this illustration clockwise), the mirror 1 attached thereto turns with it, and after a displacement of 1°30′ the faces 2 and 3 of the annular mirror 1 are in positions 2′ and 3′ respectively. The shaded area 5 shows the reflected light received by the autocollimator from the mirrored face 3 and shaded area 6 shows the reflection from mirrored surface 2′ (viz: after the member has rotated 1°30′ to position 2′). It should be noted that the reflected light enters different parts of the lens. The reflected light from faces 2 and 3′ is reflected out of the path of the autocollimator and is not received.

With the conventional annular mirror 1 (FIGURE 1 and FIGURE 2) the center of rotation 4 is not far enough away from the mirrored surfaces 2, 3, to enable the rays of reflected light 5 and 6 to be incident on the same area of the autocollimator's lens. It would involve a mirror of approximately two and one-half (2½) feet radius to achieve the desired results. Since this is not a feasible solution because of space requirements and cost, a new type of mirror prism 9 shown by FIGURE 3 and FIGURE 4 was devised.

Figure 3:
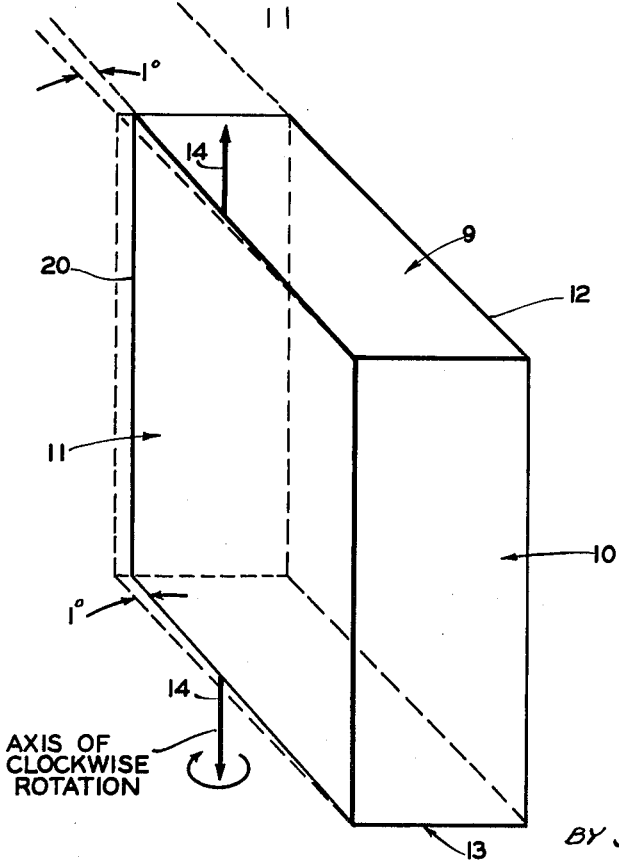
FIGURE 3 is a perspective view of the improved prism, and, FIGURE 4 is a top view of the improved prism of FIGURE 3 shown schematically in operative relation with the lens of the autocollimator with light falling at a preferred angle to the surface.

The improved mirror prism 9 in FIGURE 3 may, for example, be formed of a solid block of quartz approximately 1.5 inches wide, 1.75 inches high, and .75 inch thick, made of a transparent material having a refractive index of approximately 1.5005. Thus a beam of incident light making an angle of 1°30′00″ with the normal of any surface of the prism, is refracted to make an angle of 1°00′00″ with the normal while passing through the prism.

The face 11 and the back 12 of the prism are parallel in the height, but are not parallel along their length being offset at an angle of 1°. If face 11 and back 12 were extended, toward the direction of the backend 20, they would interset at an angle of 1°. The face 11 is transparent while the back 12 is aluminized. Thus the improved prism 9 provides a six sided prism, one surface of which 12 is mirrored while the opposite transparent face 11 is set at a solid plane angle of one degree (1°) with the mirrored face 12.

Figure 4:
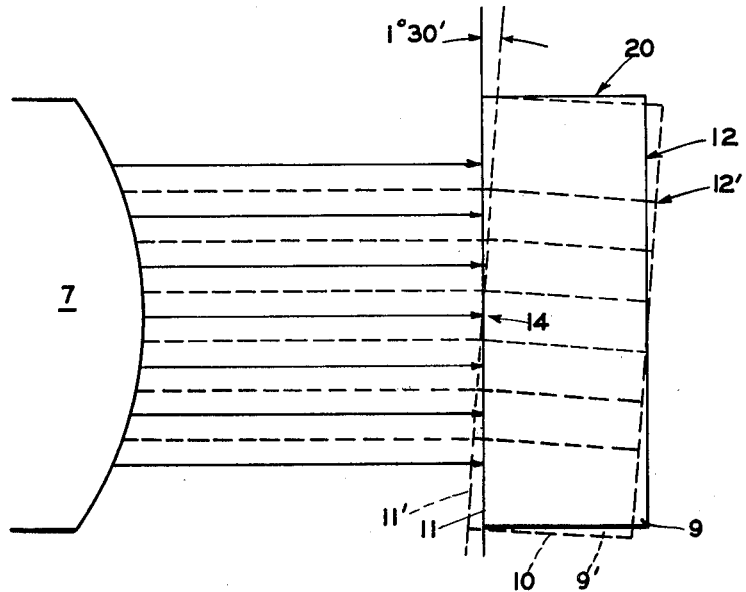

The prism 9 is mounted with its base 13 on the rotating body. A vertical center line or axis of rotation 14 of face 11 is aligned on the polar axis of the rotating body. The autocollimator 7 is aligned perpendicular to face 11 is shown in FIGURE 4. When light rays from the autocollimator are directed perpendicular to the transparent surface 11, the light rays are reflected back into the autocollimator 7 as indicated by the shaded area.

As the body with the attached prism 9 is rotated clockwise 1°30′00″ to 9′, the surface 11 and 12 are rotated respectively to positions 11′ and 12′, as shown in FIGURE 4 by dash lines. When the body has rotated exactly 1°30′00″ the rays of light will fall perpendicular on the back 12′ due to a refraction at face 11, plus the 1° offset between face 11′ and back 12′—and light emanated by the autocollimator will be reflected at mirrored surface 12 to travel back along the same path on which it came. Or put in the form of an equation light will be reflected back into the autocollimator lens for a given rotation of the prism when $$D = R + O$$

where D is equal to the angle the prism is rotated through; R is equal to the difference between the angle of incidence less the angle of refraction; and O is equal to the offset angle between the front and rear face, where the offset angle and the rotation angle are in the same direction.

When the prism 9 is perpendicular, and when it has been rotated 1°30′00″, eminated and reflected rays of light pass through the same portion of the autocollimator lens system. Thus any imperfection in the lens system are cancelled out.

If the body has been rotated counter clockwise (or if the setoff angle was toward the other end of the prism), no image would be returned to the autocollimator.

The prism 9 here is made out of quartz with a refractive index of approximately 1.5005. The offset angle between the face 11 and the face 12 was chosen here as one degree. The size of the prism was 1.75 x 1.5 x .75 inches. Prisms with different refractive indexes, having a different offset angle and of different sizes can equally well be used.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:
1. In a system for measuring slow angular velocities of a body rotatable about an axis comprising an autocollimator for emitting light rays, a transparent prism reflecting member which is attached to said body and which has a first and a second flat face, said first flat face having an axis of rotation in alignment with the rotational axis of said body, said second flat face being inclined at a small angle to said first flat face and extending in spaced relation to the rotational axis of said body and parallel thereto, said prism and said autocollimator being positioned relative to each other such that in a first position a portion of said rays are reflected from said first face of the prism back to the autocollimator, and in a second position a portion of the rays are refracted at the first face, reflected at the second face back through said prism to said first face where these rays are refracted to re-enter said autocollimator along the same path as the rays emitted from said autocollimator.

2. The structure defined by claim 1 wherein said first and second flat faces receiving the rays from said autocollimator are greater in cross-sectional size than the emitting light rays in order that the total cross-sectional area of the rays presented from said autocollimator are reflected back along the same path that the rays have left the autocollimator to provide thereby an error-free light signal as viewed through said autocollimator.

References Cited by the Examiner

UNITED STATES PATENTS

| 1,909,526 | 5/1933 | Falge et al. | 88—77 |
| 2,684,011 | 7/1954 | Smith et al. | 88—14 |
| 2,906,161 | 9/1959 | Thompson | 88—14 |
| 3,117,178 | 1/1964 | Webber | 88—14 X |

FOREIGN PATENTS 922,582  2/1947  France.

JEWELL H. PEDERSEN, Primary Examiner.
EMIL G. ANDERSON, Examiner.